Oct. 31, 1933.  F. L. BARCHARD  1,933,085
VALVE
Filed Dec. 26, 1931
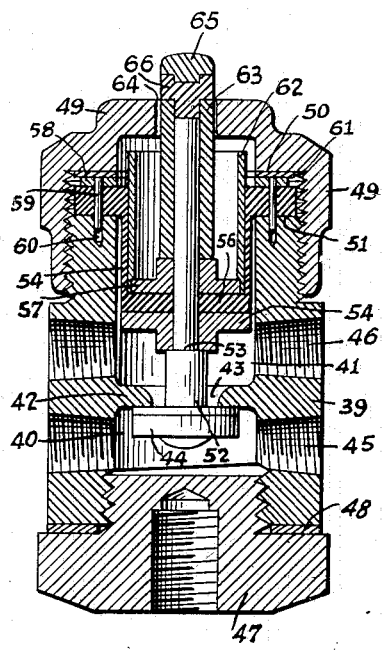
Inventor
Frank L. Barchard.

Patented Oct. 31, 1933

1,933,085

UNITED STATES PATENT OFFICE 1,933,085

VALVE

Frank L. Barchard, Chicago, Ill., assignor of one-half to Max H. Sussin, Chicago, Ill.

Application December 26, 1931
Serial No. 583,187

2 Claims. (Cl. 251—31)

My invention relates to valve structures for controlling the flow of fluids, either liquid or gaseous.

An important object of the invention is to provide structure and arrangement which will eliminate seepage or leakage without the use of expensive packing means and structure.

A further object is to provide construction and arrangement which will eliminate the necessity of special guiding means for the valve movement.

Still another object is to provide seepage and leak preventing means in the form of a flexible wall or diaphragm structure preferably in the form of molded rubber, such wall or diaphragm being intimately associated with the valve stem and the valve structure frame to prevent escape of fluid except through the regular discharge orifices.

Still a further object is to utilize the flexible wall or diaphragm for guiding the valve in its opening and closing movements and permitting movement of the valve to accurately engage with its seat.

The above enumerated and other features of the invention are incorporated in the structure disclosed on the drawing, in which drawing The figure is a vertical diametral section of a valve to which my invention is applied.

The structure shown comprises the body 39 providing a high pressure chamber 40 and a lower pressure chamber 41, the chambers being separated by a wall 42 having the port 43 therethrough and whose underside forms a seat for the valve disc 44. The chamber 40 has inlet passages 45 for pipes which conduct fluid under pressure, and the chamber 41 has outlet passageways 46 for connection with suitable pipes or other conductors. A plug 47 has threaded engagement with the body 39 to close the lower end of the inlet chamber 40, a gasket 48 being preferably interposed between the plug and body.

The upper end of the body 39 is cylindrical and is threaded to receive the threaded side wall of the cap 49 which cap provides the annular abutment shoulder 50 opposite to the upper surface 51 of the body 39.

The valve stem 52 extends upwardly from the valve 44 and concentrically through the body structure 39 and cap 49, the outer end of the stem being of reduced diameter to leave a shoulder 53 for seating a lower abutment disc 54 which snugly fits the stem. The resilient diaphragm structure shown comprises the cylindrical cup or bag shaped body 54 and the radially extending annular flange 55 at its rim. The external diameter of the diaphragm body 54 is slightly less than the diameter of the bore or chamber 41 of the body 39 and the bottom 56 of the diaphragm has a central opening receiving the valve stem and seats against the abutment disc 54, the upper abutment disc 57 receiving the stem and clamping the bottom 56 to the disc 54, the discs being accurately fitted on the valve stem and, after application thereto, being secured to the stem as by soldering.

The flange 55 of the diaphragm structure seats against the upper surface 51 of the valve structure body 39 to be clamped against such surface by the cap 49. Means are preferably provided for preventing rotation of the diaphragm member when the cap is screwed into place. I have shown a flat washer 58 applied to the outer side of the flange 55 and pins 59 extending therefrom through the flange and into opening 60 in the body 39. Between the washer 58 and the shoulder 50 of the cap 59 a gasket washer 61 may be interposed. With this arrangement, when the cap 49 is screwed onto the body or unscrewed therefrom, the resulting friction will be taken up by the washer 58 and the pins 59 will prevent rotation of the diaphragm structure but will permit compression thereof between the body 39 and the cap so that the flange 55 and the washer 61 will form a tight joint and prevent seepage or leakage between the body 39 and the cap.

To reinforce the diaphragm and prevent inward bulge thereof under fluid pressure, a stiffening or reinforcement sleeve 62, preferably of metal, is inserted in the diaphragm body and preferably seats at its lower end around the edge of the upper abutment disc 57. With this arrangement, when the chamber 41 is subjected to pressure when the valve 44 is open to fluid flow, the fluid will flow upwardly to the clearance space between the diaphragm body and the valve structure body 39 and will tend to keep the cylindrical wall of the diaphragm pressed against the reinforcing shell 62 to prevent buckling of this wall.

The pressure in the high pressure chamber 40 acting against the valve 44 will tend to hold the valve in closed position, and for depressing the valve to open the port 43 a sleeve 63 is applied around the upper end of the valve stem to seat on the upper abutment disc 57, this sleeve extending through an opening 64 in the top wall of the cap 49 where it may be engaged for depressing movement to shift the stem downwardly and the valve to open position. Where electrical or electro-magnetic appliances are used for operating the valve, an abutment head 65 may be provided for the sleeve 63 and preferably separated therefrom by insulating material 66 so as to insulate the valve structure from current flow. Pressure on the end 65 either manually or otherwise will cause opening of the valve and such movement is readily permitted by the flexible and elastic wall 64 of the diaphragm structure. The diaphragm body may be given an initial stretch or expansion so that upon release of pressure on the stem it will tend to move the valve toward closed position for final closure by the pressure.

By eliminating special packing and guiding means usually necessary in valve structures of the type referred to for preventing seepage or leakage, the valve structure described may be economically manufactured. The resilient yieldable wall structure, besides efficiently preventing leakage, acts as a guide for the valve and permits freedom of movement thereof for accurate cooperation with the valve seat, and as the leakage preventing structure is never put to any serious stresses or strains, it will be of long life and the valve structure will require very little attention.

I have shown a practical and efficient embodiment of the features of my invention, but I do not desire to be limited to the exact construction and arrangement shown and described as changes and modifications may be made without departing from the scope of the invention as defined in the appended claims.

I claim as follows:

1. In valve structure, the combination of a body having a chamber therein, a wall forming one end of said chamber and having a port therethrough, a valve for cooperating with said port and having a stem extending through said chamber, a cap forming a wall for closing the other end of said chamber and having detachable connection with said body, a cylindrical cup shaped diaphragm in said chamber concentric with said stem and having a flange at its rim clamped between said body and said cap, means securing the bottom of said diaphragm to said stem, there being clearance space between said diaphragm and the chamber wall whereby said diaphragm will be subjected externally to pressure of fluid whose flow is controlled by said valve, and a cylindrical reinforcing shell abutting the inner side of said diaphragm and movable with the stem and concentric therewith for preventing buckling of said diaphragm under fluid pressure.

2. In valve structure, the combination of a body having a chamber therein, a wall forming one end of said chamber and having a port therethrough, a valve for cooperating with said port and having a stem extending therefrom through said chamber, a cap forming a wall for closing the other end of said chamber and having detachable connection with said body, a cylindrical cup-shaped diaphragm of flexible fluid-proof material in said chamber concentric with said stem and having a flange at its rim clamped between said body and said cap, upper and lower abutments on said stem between which the bottom of said diaphragm is clamped, and a metallic reinforcing shell abutting the inner side of said diaphragm and mounted on said upper abutment to be concentric with said stem, said shell protecting said diaphragm against buckling under pressure of fluid whose flow is controlled by said valve.

FRANK L. BARCHARD.